Oct. 8, 1940.   C. F. HAMMOND   2,216,881
DIRECTION SIGNAL SWITCH
Filed Feb. 2, 1939   2 Sheets-Sheet 1
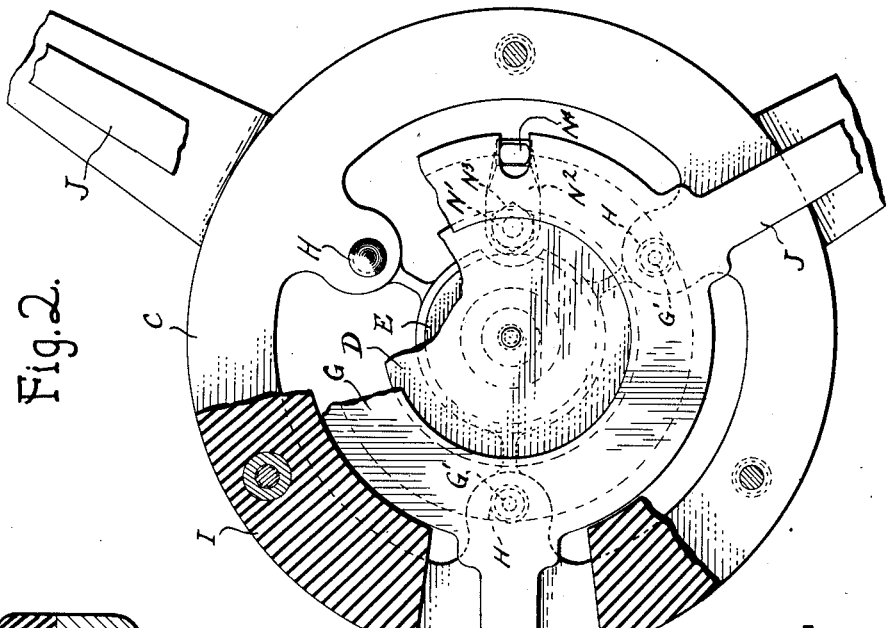
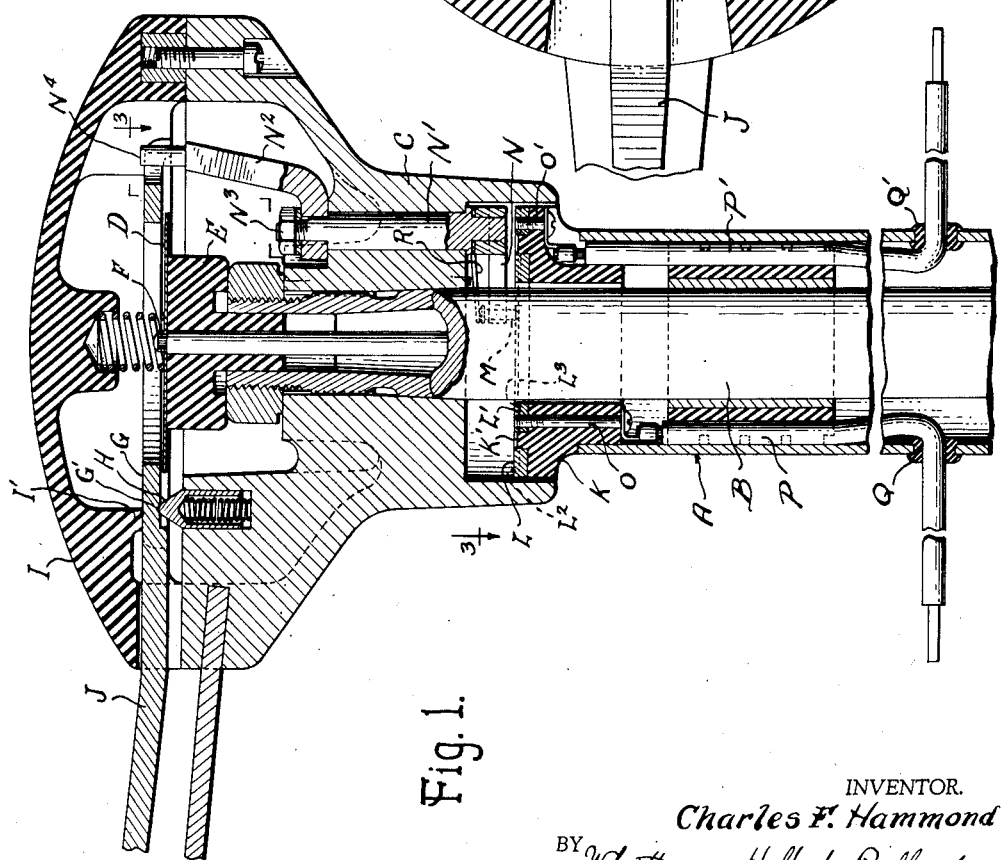
INVENTOR.
Charles F. Hammond
BY Whittemore Hulbert Belknap
ATTORNEYS Oct. 8, 1940.          C. F. HAMMOND          2,216,881
DIRECTION SIGNAL SWITCH
Filed Feb. 2, 1939          2 Sheets-Sheet 2

INVENTOR.
Charles F. Hammond
BY Whittemore Hulbert & Belknap
ATTORNEYS

Patented Oct. 8, 1940

2,216,881

UNITED STATES PATENT OFFICE 2,216,881

DIRECTION SIGNAL SWITCH

Charles F. Hammond, Detroit, Mich., assignor to Gemmer Manufacturing Company, Detroit, Mich., a corporation of Michigan Application February 2, 1939, Serial No. 254,309

8 Claims. (Cl. 200—59)

The invention relates to direction signals for use on motor vehicles to indicate when the operator intends to turn either to the right or to the left. It is the object of the invention to obtain a construction which may be readily installed in connection with any standard steering mechanism, and which while manually operated, will be automatically restored to neutral. To this end the invention consists in the novel construction as hereinafter set forth.

In the drawings:

Figure 1 is a vertical section of a portion of a steering post and steering wheel of a motor vehicle illustrating my improved direction signal mechanism applied thereto;

Figure 2 is a plan view of Figure 1;

Figure 3:
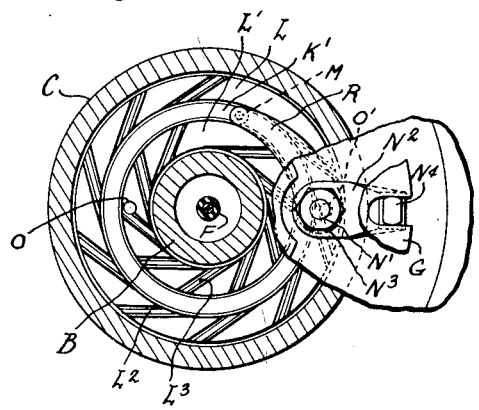
Figures 3, 4 and 5 are sections substantially on line 3—3 of Figure 1, showing the direction signal control mechanism respectively in neutral position and in positions for right and left turns.

My improvements relate to the control means which may be used in connection with any suitable signal means, and I have, therefore, omitted illustration of the latter. It will be understood that the closing of one electric circuit will operate a signal indicating a right turn and the closing of another circuit will operate a signal indicating a left turn. As shown, A is the stationary steering post, B is the rotatable steering stem and C the hub of the steering hand wheel. It is customary to place the horn operating switch in connection with this hub, and in certain constructions this is formed by a ring member surrounding the hub, which when tilted will close the switch within the hub. I preferably make use of such construction to operate my improved direction signal without interfering with the function of sounding the horn. Thus, as shown, D is a metallic plate which is mounted within the hollow hub C resting upon an insulator support E which engages the upper end of the steering column B. An insulated conductor F extending downward through the steering stem, forms an electrical connection between the plate D and the horn operating mechanism (not shown). G is an annular member within the hollow hub overlapping but normally spaced from the peripheral portion of the plate D. This member engages a recess in the insulator hub cap I and is supported by a plurality of spring pressed members H, which are pointed to engage recesses G' in the underside of the member G, and to press the latter upward against the bearing I' on the cap member I of the hub. The member G has a series of spokes J projecting radially outward, which at their outer ends are attached to the operating ring (not shown). Thus, whenever pressure is placed upon any portion of the ring, it will, through the spokes J, press downward the annular member G until it contacts with the plate D. This will ground the electrical connection and thereby sound the horn. The construction just described has heretofore been used and is not my invention.

My improved direction signal comprises an electric circuit closer which is operable through the medium of the member G and its connections without interfering with its normal function of operating the horn. The circuit closing switch is preferably mounted on the steering post in a position to be enclosed by the hub C and as shown, it comprises the following construction. K is an insulator block mounted on the upper end of the post A and having on its upper face two electrical contact rings L and L' surrounding the steering stem and concentric with the axis thereof. These rings are spaced from each other to leave an intermediate insulator portion K' upon which normally rests a cooperating contact member M. The member M is carried by a rock arm N on a vertically extending rock-shaft N' rotatively mounted with the hub C and having at its upper end an actuating rock arm N² detachably secured thereto by the nut N³. The rock arm N² extends upward and has a portion N⁴ which engages a notched bearing in the member G. The arrangement is such that the tilting of the member G which causes it to close contact with the plate D and to thereby sound the horn, will have no effect upon the rock arm N² and its connections, but if this member G is slightly rotated in either direction from its neutral position this, through the rock arm N², will slightly rotate the rockshaft N', and through the rock arm N will move the contact M off from the insulator K' and on to one or the other of the contact rings L and L'. These rings are respectively connected by screws O and O' with electrical conductors P and P'. These conductors are insulated and have a portion thereof arranged within the steering post A, passing therefrom out through insulator bushings Q and Q' and onward to the direction signals (not shown) respectively for indicating left and right turns. As the contact M and its mounting are grounded, it will, when in contact with either ring, complete an electrical circuit and thereby operate the corresponding signal.

With the device as thus far described, the operator can at any time actuate the member G to operate one or the other of the direction signals. If, however, he should fail to return the member G to neutral position then the signal would continue in display after the completion of the turn. To avoid this I have provided automatic means for returning the contact M to its neutral position where it rests on the insulator ring K' after the completion of the turn of the vehicle. This means comprises an engagement between the contact M and each of the rings L and L', such that in case the contact M is in engagement with the outer ring L, a rotation of the steering wheel in one direction will force the contact radially inward until it rests on the insulator K'. On the other hand, in case the contact M is in engagement with the inner ring L', a rotation of the steering wheel in the opposite direction will force it radially outward to rest upon the insulator K'. The direction of rotation of the steering wheel in each instance, is not that which turns the car, but rather that which restores the steering mechanism to neutral after the turn is completed. Thus, after the operator has manually actuated the member G to indicate an intended turn, the indication will remain during the turning of the car, but will cut out at the completion of this turn.

While various specific constructions may be used for accomplishing the result just described, I preferably use a construction in which the rings L and L' have grooved or ridged upper surfaces, said grooves or ridges L² and L³ inclined with respect to the radius of the ring. The contact M is resiliently pressed against the ridged or grooved surface and is, therefore, capable of riding over said ridges or grooves when the rock arm N is at the limit of its movement in one direction. For instance, when the rock arm N is in position where the contact M engages with the outer ring L, further outward movement of said arm is prevented by the enclosing hub C. On the other hand, where the rock arm N is moved inward to engage the contact M with the ring L', the steering stem B will limit its further inward movement. Consequently, the ridges or grooves in each ring only function to move the rock arm N radially when it is rotated in one direction, viz.: the direction to return the steering mechanism to neutral. Specifically, as shown, the contact M is a headed pin slidable in a bearing in the rock arm N, while a resilient arm R engaging the head of said pin, presses it toward the contact ring. The arm R may be secured between the hub of the rock arm N and the rockshaft N'.

Figure 4:
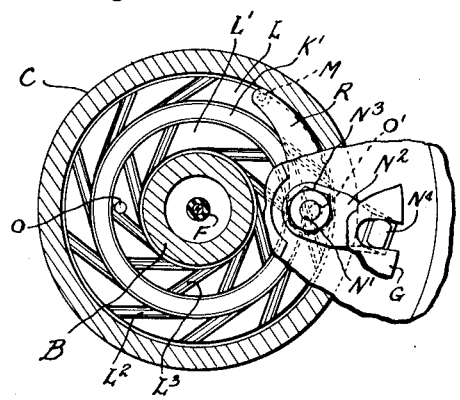
Figure 5:
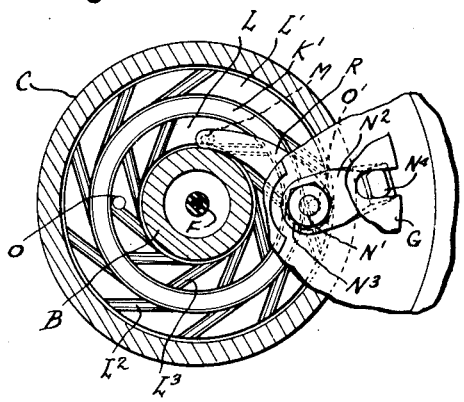
Figure 6:
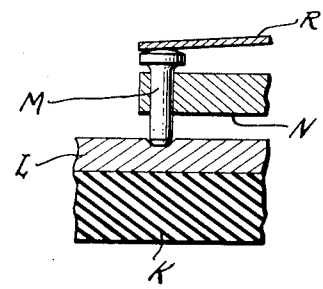
Figure 6 is an enlarged section showing the engagement means between the cooperating electrical contacts.

With the construction as above described, the operation is as follows. In normal position the arm N is as illustrated in Figure 3, where the contact pin M rests upon the insulator portion K' between the contact rings L and L'. Assuming that the operator intends to make a right turn, he will rotate the member G in this direction, which through the arm N² will rock the shaft N' and arm N carrying the pin M into contact with the ring L, as indicated in Figure 4. Subsequently, when the right turn is executed, the turning of the steering wheel will rotate the arm N around the contact L, but the ridges or grooves L² will have no effect other than to hold said arm in its outer position. As soon, however, as the turn is effected and the steering wheel is returned to neutral position, this will rotate the arm N in the opposite direction with respect to the contact ring L whereupon the grooves or ridges L² will cam the contact pin M inward out of engagement with the ring L. It is necessary that the electrical connection between the pin M and ring L should be completely broken and this is accomplished by a further function performed by the spring pins H. These pins have pointed ends which engage V-shaped recesses in the member G, and therefore as soon as the point of the pin has passed the periphery of this recess the spring will press it into full engagement, thereby producing a camming action, further rotating the member G and moving the pin M clear of the contact ring L. This will completely restore the member G to its normal position. If instead of a right turn, a left turn is indicated the member G is turned to the left which will move the arm N inward into the position shown in Figure 5. From this position it is returned to neutral by the return movement of the steering wheel in the same manner as just described.

What I claim as my invention is:

1. The combination with a steering gear including a rotary hand wheel and a stationary post, of a horn signal circuit closer mounted on said steering wheel, a direction signal circuit closer mounted within said post, a member mounted on said steering wheel rotatively adjustable with respect to said wheel to close the circuit closer within said post and transversely movable to close the circuit closer on said wheel, and means operated by the turning of said hand wheel in one direction for opening the circuit closer on said post.

2. The combination with a steering gear including a rotary hand wheel, a rotary stem attached thereto and a stationary hollow post enclosing said stem, of a direction signal switch including an annular insulated electrical contact member mounted within said post and surrounding said stem, a cooperating contact member mounted to rotate with said stem, a member mounted on said steering wheel manually operable to shift said cooperating contact member radially into engagement with said annular contact member, and means operated by the rotation of said wheel and stem in one direction for moving said cooperating contact member out of engagement with said annular contact member.

3. The combination with a steering gear including a rotary hand wheel, a rotary stem attached thereto and a stationary hollow post enclosing said stem, of a direction signal switch including a pair of spaced concentrically arranged insulated annular contact members mounted within said hollow post and surrounding said stem, a cooperating contact member mounted to rotate with said stem and normally located between said annular contact members, means mounted on said steering wheel manually operable in one direction to move said cooperating contact member into engagement with one of said annular contact members, and in another direction to engage said cooperating contact member with the other of said annular contact members, means automatically operated by the rotation of said steering wheel in one direction for returning said cooperating contact member from its engagement with one of said annular contact members, and means automatically operated by the rotation of said steering wheel in the opposite direction for returning said cooperating contact member from engagement with the other of said annular contact members.

4. The combination with a steering gear including a rotary hand wheel, a rotary stem, and a hollow post surrounding said stem, of a direction signal switch including a pair of circuit closers, one operable to indicate an intended turn to the right and the other operable to indicate an intended turn to the left, said circuit closers comprising a pair of spaced concentric insulated annular contact members mounted within said post and surrounding said stem, and a common cooperating contact member mounted to rotate with said stem and normally located between said annular contact members out of electrical connection therewith, means mounted on said rotary wheel manually operable in one direction to move said cooperating contact member into electrical connection with one of said annular contact members and movable in another direction to move said cooperating contact member into electrical connection with the other of said annular contact members, and engagement means between said cooperating contact member and annular contact members such that the rotation of said steering wheel in one direction will move said cooperating contact member out of electrical connection with one of said annular contact members and a movement of said steering wheel in the opposite direction will move said cooperating contact member out of electrical connection with the other of said annular contact members.

5. The combination with a steering gear including a rotary hand wheel, a rotary stem and a stationary hollow post surrounding said stem, of a direction signal switch including a circuit closer having an annular insulated contact member mounted within said post and surrounding said stem, a cooperating contact member mounted to rotate with said stem and normally electrically disconnected from said annular contact member, means mounted on said wheel for moving said cooperating contact member radially into electrical connection with said annular contact member, and a series of cams on said annular contact member over which said cooperating contact member will ride when said steering wheel is rotated in one direction, said cams operating to return said cooperating contact member to its normal position when said steering wheel is rotated in the opposite direction.

6. The combination with a steering gear including a rotary hand wheel, a rotary stem and a stationary hollow post surrounding said stem, of a direction signal switch including a circuit closer having an annular insulated contact member mounted within said post and surrounding said stem, a cooperating contact member mounted to rotate with said stem and normally electrically disconnected from said annular contact member, means mounted on said wheel for moving said cooperating contact member radially into electrical connection with said annular contact member, a series of cams on said annular contact member over which said cooperating contact member will ride when said steering wheel is rotated in one direction, said cams operating to return said cooperating contact member when said steering wheel is rotated in the opposite direction, and additional means for further moving said cooperating contact member after disengagement from said cams to insure breaking of the electrical circuit.

7. The combination with a steering gear including a rotary hand wheel, a rotary stem and a stationary hollow post surrounding said stem, of a horn signal switch including a member mounted on said hand wheel and adapted to be tilted to close an electric circuit, a spring pressed pin for normally lifting said member to open said circuit, said pin having a conical end engaging a conical recess in said member, and a direction signal including a circuit closer having an annular insulated contact member mounted within said post and surrounding said stem, a cooperating contact member mounted to rotate with said stem and normally electrically disconnected from said annular contact member, means mounted on said wheel and cooperating with said horn signal member for moving said cooperating contact member radially into electrical connection with said annular contact member upon a rotation of said horn signal member, a series of cams on said annular contact member over which said cooperating contact member will ride when said steering wheel is rotated in one direction, said cams operating to return said cooperating contact member toward its normal position when said steering wheel is rotated in the opposite direction, said spring pressed pin functioning to further rotate said horn signal member and the parts operated thereby to insure complete breaking of the electric circuit.

8. The combination with a steering gear including a rotary hand wheel, a rotary stem and a stationary hollow post surrounding said stem, of a direction signal switch including a circuit closer having an annular insulated contact member mounted within said post and surrounding said stem, a cooperating contact member mounted to rotate with said stem and normally electrically disconnected from said annular contact member, means mounted on said wheel and operable from above the same for moving said cooperating contact member radially into electric connection with said annular contact member to remain in contact therewith when said wheel is rotated in one direction, and means for automatically returning said cooperating contact to normal position when said wheel is rotated in the opposite direction.

CHARLES F. HAMMOND.